United States Patent
Leuchtenberg et al.

(10) Patent No.: US 9,284,800 B2
(45) Date of Patent: Mar. 15, 2016

(54) DRILL PIPE CONNECTOR

(75) Inventors: Christian Leuchtenberg, Belgium (DE); Rae Younger, Scotland (GB); Alex Macgregor, Kirkcudbright (GB); Jonathan Buckland, Scotland (GB)

(73) Assignee: Managed Pressure Operations PTE Ltd., Singapore (SG)

( * ) Notice: Subject to any disclaimer, the term of this patent is extended or adjusted under 35 U.S.C. 154(b) by 866 days.

(21) Appl. No.: 13/262,655

(22) PCT Filed: Mar. 31, 2010

(86) PCT No.: PCT/GB2010/050571
§ 371 (c)(1),
(2), (4) Date: Dec. 28, 2011

(87) PCT Pub. No.: WO2010/112933
PCT Pub. Date: Oct. 7, 2010

(65) Prior Publication Data
US 2012/0090853 A1 Apr. 19, 2012

(30) Foreign Application Priority Data
Apr. 3, 2009 (GB) .................................. 0905802.5

(51) Int. Cl.
*F16L 37/256* (2006.01)
*E21B 21/10* (2006.01)
*F16L 41/16* (2006.01)

(52) U.S. Cl.
CPC .............. *E21B 21/106* (2013.01); *F16L 41/16* (2013.01)

(58) Field of Classification Search
CPC ...... E21B 21/106; E21B 34/02; F16L 37/008; F16L 37/256; F16L 37/24
USPC .......... 166/379, 85.1, 85.5, 90.1, 77.51, 76.1; 175/214, 215, 218; 285/133.21, 133.3, 285/376; 137/515.5, 112
See application file for complete search history.

(56) References Cited

U.S. PATENT DOCUMENTS

| | | |
|---|---|---|
| 704,423 A | 7/1902 | Allen |
| 1,491,986 A | 4/1924 | Greene |

(Continued)

FOREIGN PATENT DOCUMENTS

| | | |
|---|---|---|
| EP | 1248065 A2 | 10/2002 |
| EP | 1048819 B1 | 2/2004 |

(Continued)

OTHER PUBLICATIONS

PCT Int'l Search Report dated Dec. 29, 2010; Int'l App. No. PCT/GB2010/050571; Int'l Filing Date: Mar. 31, 2010.

(Continued)

*Primary Examiner* — Blake Michener
*Assistant Examiner* — Kipp Wallace
(74) *Attorney, Agent, or Firm* — Bracewell LLP; Constance Gall Rhebergen; Linda L. Morgan

(57) ABSTRACT

An assembly of a drill pipe and a connector (10) for connecting a hose (50) to a side-bore (52) of a the drill pipe (54), the drill pipe (54) having a wall (54a) enclosing a main bore (54b), and the side-bore (52) extending through the wall (54a) from the main bore (54b) to the exterior of the drill pipe (54), the connector (10) comprising a hose connector body (12) which forms a first end of the connector (10) which is adapted to be connected to the hose (50), and a drill pipe connector body (14) which forms a second end of the connector (10) which is connected to the drill pipe (54), the connector (10) having an exterior surface and an interior surface which encloses a bore (20, 22) extending from the first end of the connector (10) to a second end of the connector (10), the drill pipe connector body (12) being provided with at least one bayonet connector formation (44) which extends from the exterior surface of the connector (10) generally radially outwardly relative to the bore (20, 22), the bayonet connector formation (44) extending over less than half of the circumference of the exterior surface of the drill pipe connector body (14), wherein the drill pipe connector body (14) is also provided with means for ensuring a substantially fluid tight seal between the connector (10) and the surface of the drill pipe (54) enclosing the side-bore (52).

25 Claims, 6 Drawing Sheets

(56) References Cited

U.S. PATENT DOCUMENTS

Figure 1:
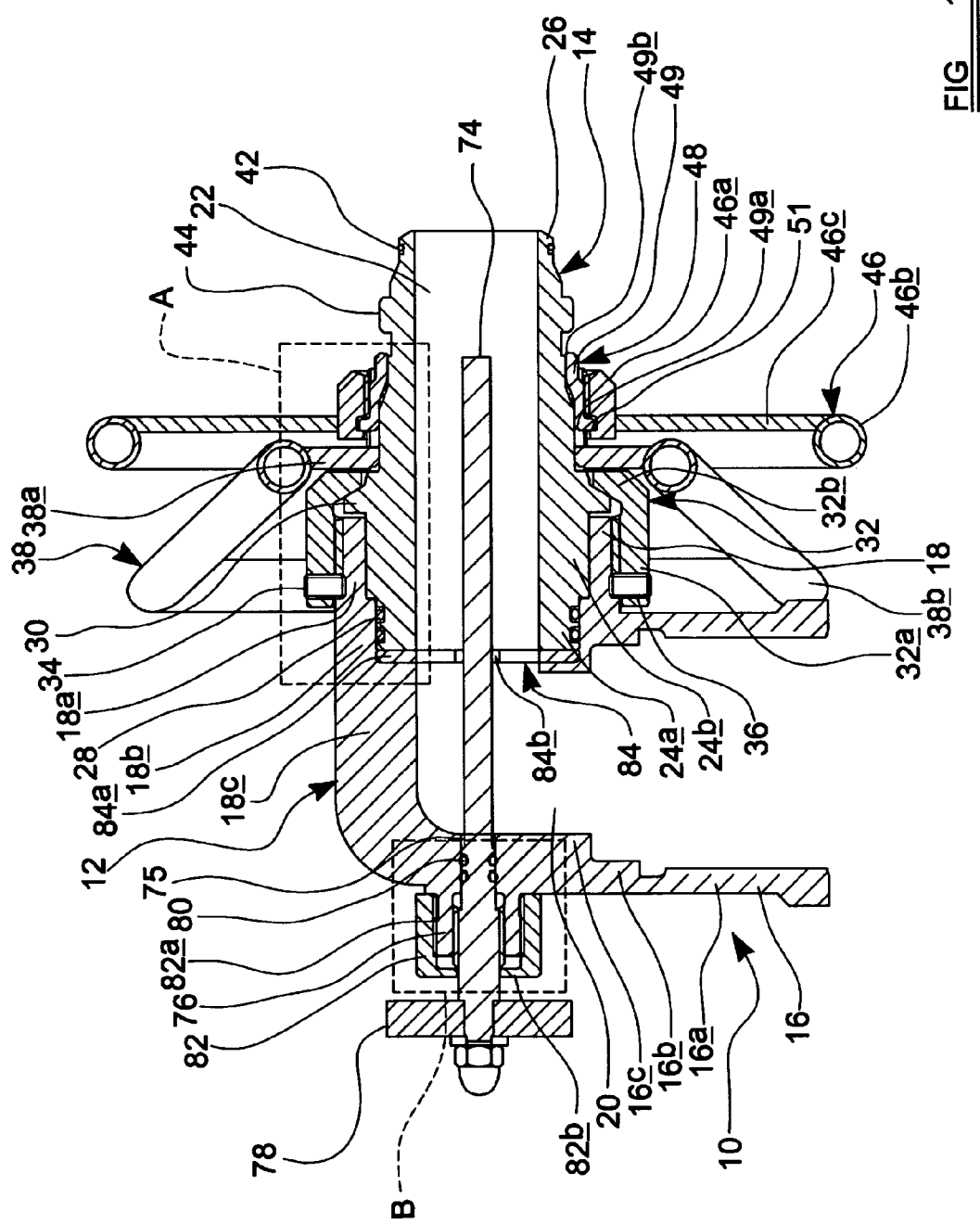

| | | | |
|---|---|---|---|
| 1,615,595 A * | 1/1927 | O'Connor | 285/88 |
| 2,102,555 A | 12/1937 | Dyer | |
| 2,158,356 A | 5/1939 | Dyer | |
| 2,213,309 A * | 9/1940 | Fortune | 137/322 |
| 2,751,927 A * | 6/1956 | Kinney | 137/322 |
| 2,972,466 A * | 2/1961 | Allen et al. | 251/35 |
| 3,298,385 A * | 1/1967 | Jackson et al. | 137/112 |
| 3,338,319 A | 8/1967 | Griffin, III | |
| 3,470,971 A | 10/1969 | Dower | |
| 4,448,267 A | 5/1984 | Crawford, III et al. | |
| 4,449,737 A * | 5/1984 | Specht | 285/7 |
| 4,471,978 A * | 9/1984 | Kramer | 285/321 |
| 4,685,520 A | 8/1987 | McDaniel et al. | |
| 4,770,389 A | 9/1988 | Bodine et al. | |
| 4,782,852 A | 11/1988 | Legris | |
| 4,823,877 A | 4/1989 | McDaniel et al. | |
| 4,867,254 A | 9/1989 | Gavignet | |
| 5,070,949 A | 12/1991 | Gavignet | |
| 5,080,182 A | 1/1992 | Thompson | |
| 5,115,871 A | 5/1992 | McCann et al. | |
| 5,241,980 A * | 9/1993 | Corte | 137/315.02 |
| 5,431,188 A | 7/1995 | Cove | |
| 5,628,493 A | 5/1997 | McKnight et al. | |
| 5,975,219 A | 11/1999 | Sprehe | |
| 6,244,631 B1 | 6/2001 | Payne et al. | |
| 6,315,051 B1 | 11/2001 | Ayling | |
| 6,374,925 B1 | 4/2002 | Elkins et al. | |
| 7,107,875 B2 | 9/2006 | Haugen et al. | |
| 8,100,199 B2 | 1/2012 | Braddick | |
| 2005/0045839 A1 * | 3/2005 | Kajitani | 251/14 |
| 2005/0092523 A1 | 5/2005 | McCaskill et al. | |
| 2006/0060360 A1 | 3/2006 | Moncus et al. | |
| 2006/0124352 A1 | 6/2006 | Krueger et al. | |
| 2006/0254822 A1 | 11/2006 | Ayling | |
| 2006/0278434 A1 | 12/2006 | Calderoni et al. | |
| 2007/0151762 A1 | 7/2007 | Reitsma | |
| 2007/0231158 A1 | 10/2007 | Butler et al. | |
| 2009/0025930 A1 * | 1/2009 | Iblings et al. | 166/244.1 |
| 2009/0242817 A1 | 10/2009 | Strazhgorodskiy | |
| 2010/0089646 A1 * | 4/2010 | Drivdahl et al. | 175/55 |
| 2010/0155143 A1 | 6/2010 | Braddick | |
| 2011/0095522 A1 * | 4/2011 | Legrand et al. | 285/81 |
| 2011/0203670 A1 | 8/2011 | Braddick | |

FOREIGN PATENT DOCUMENTS

| | | | |
|---|---|---|---|
| EP | 1754947 A2 | 2/2007 | |
| GB | 702085 A | 1/1954 | |
| GB | 2119046 A | 11/1983 | |
| GB | 2290330 A | 12/1995 | |
| GB | 2314106 A | 12/1997 | |
| GB | 2427217 B | 10/2008 | |
| GB | 2451699 A | 2/2009 | |
| WO | WO 0236928 A1 | 5/2002 | |
| WO | WO 2004074627 A1 | 9/2004 | |
| WO | WO 2005019596 A1 | 3/2005 | |
| WO | WO 2005080745 A1 | 9/2005 | |
| WO | WO 2007005822 A2 | 1/2007 | |
| WO | WO 2007124330 A2 | 11/2007 | |
| WO | WO 2008051978 A1 | 5/2008 | |
| WO | WO 2008095650 A1 | 8/2008 | |
| WO | WO 2008156376 A1 | 12/2008 | |
| WO | WO 2009018173 A2 | 2/2009 | |
| WO | WO 2009022914 A1 | 2/2009 | |
| WO | 2009093069 A2 | 7/2009 | |
| WO | WO 2010046653 A2 | 4/2010 | |

OTHER PUBLICATIONS

UK Examination Report dated Mar. 15, 2013; App. No. GB0905802.5; Managed Pressure Operations Pte. Ltd.

EP Examination Report dated Jul. 24, 2013; App. No. 10712476.0.

GB International Search Report for GB0905633.4, Aug. 10, 2009, 1 page.

Adri Schouten, PCT International Search Report for PCT/EP2010/054387, Sep. 23, 2010, 2 pages.

Skalle, Pal, "Trends Extracted From 800 Gulf Coast Blowouts During 1960-1996" Society of Petroleum Engineers, IADC/SPE 39354, 1998 IADC/SPE Drilling Conference held in Dallas, Texas, Mar. 3-6, 1998, pp. 539-546.

Schubert, J.A. and Wright, J.C., "Early Kick Detection Through Liquid Level Monitoring in the Wellbore" Society of Petroleum Engineers, IADC/SPE 39400, 1998 IADC/SPE Drilling Conference held in Dallas, TX, Mar. 3-6, 1998, pp. 889-895, Copyright 1998, IADC/SPE Drilling Conference.

Hutchinson, M., Rezmer-Cooper, A and L. and Schlumberger, "Using Downhole Annular Pressure Measurements to Anticipate Drilling Problems" Society of Petroleum Engineers, SPE 49114, 1998 SPE Annual Technical Conference and Exhibition held in New Orleans, LA, Sep. 27-30, 1998, pp. 535-549, Copyright 1998, Society of IADC/SPE Drilling Conference.

PCT International Search Report, dated Nov. 3, 2010, International Application No. PCT/EP2010/063579, filed Sep. 15, 2010.

GB International Search Report for GB0905802.5, Jul. 31, 2009, 2 pages.

Stephane Ott, PCT International Search Report for PCT/GB2010/050571, Dec. 17, 2010, 2 pages.

* cited by examiner

DRILL PIPE CONNECTOR

RELATED APPLICATION

This application claims priority to PCT application PCT/GB2010/050571 filed Mar. 31, 2010, which claims priority to British patent application GB 0905802.5 filed Apr. 3, 2009.

DESCRIPTION OF INVENTION

The present invention relates to a connector, particularly to a connector for connecting a mud hose to a side-bore in a section of drill pipe or pump in sub.

The drilling of a borehole or well is typically carried out using a steel pipe known as a drill pipe or drill string with a drill bit on the lowermost end. The drill string comprises a series of tubular sections, which are connected end to end.

The entire drill string may be rotated using a rotary table, or using an over-ground drilling motor mounted on top of the drill pipe, typically known as a 'top-drive', or the drill bit may be rotated independently of the drill string using a fluid powered motor or motors mounted in the drill string just above the drill bit. As drilling progresses, a flow of mud is used to carry the debris created by the drilling process out of the borehole. Mud is pumped down the drill string to pass through the drill bit, and returns to the surface via the annular space between the outer diameter of the drill string and the borehole (generally referred to as the annulus). The mud flow also serves to cool the drill bit, and to pressurise the borehole, thus substantially preventing inflow of fluids from formations penetrated by the drill string from entering into the borehole. Mud is a very broad drilling term and in this context it is used to describe any fluid or fluid mixture used during drilling and covers a broad spectrum from air, nitrogen, misted fluids in air or nitrogen, foamed fluids with air or nitrogen, aerated or nitrified fluids to heavily weighted mixtures of oil and or water with solid particles.

Significant pressure is required to drive the mud along this flow path, and to achieve this, the mud is typically pumped into the drill string using one or more positive displacement pumps which are connected to the top of the drill string via a pipe and manifold.

Whilst the main mud flow into the well bore is achieved by pumping mud into the main bore at the very top end of the drill string, it is also known to provide the drill string with a side bore which extends into the main bore from a port provided in the side of the drill string, so that mud can be pumped into the main bore at an alternative location to the top of the drill string.

For example, as drilling progresses, and the bore hole becomes deeper and deeper, it is necessary to increase the length of the drill string, and this is typically achieved by disengaging the top drive from the top of the drill string, adding a new section of tubing to the drill string, engaging the top drive with the free end of the new tubing section, and then recommencing drilling. It will, therefore, be appreciated that pumping of mud down the drill string ceases during this process.

Stopping mud flow in the middle of the drilling process is problematic for a number of reasons, and it has been proposed to facilitate continuous pumping of mud through the drill string by the provision of a side bore in each section of drill string. This means that mud can be pumped into the drill string via the side bore whilst the top of the drill string is closed, the top drive disconnected and the new section of drill string connected.

In one such system, disclosed in our co-pending patent application GB0819340.1, at the top of each section of drill string, there is provided a side bore which is closed using a plug, and a valve member which is movable between a first position in which the side bore is closed whilst the main bore of the drill string is open, and a second position in which the side bore is open whilst the main bore is closed. During drilling, the valve is retained in the first position, but when it is time to increase the length of the drill string, the plug is removed from the side bore, and an auxiliary mud hose, which extends from the pump, connected to the side bore, and a valve in the hose opened so that pumping of mud into the drill string via the side bore commences. A valve in the main hose from the pump to the top of the drill string is then closed, and either manual operation of a valve actuator or the pressure of the mud at the side bore causes the valve member to move from the first position to the second position, and hence to close the main bore of the drill string.

The main hose is then disconnected, the new section of tubing mounted on the drill string, and the main hose connected to the top of the new section. The valve in the main hose is opened, and the valve in the hose to the side bore closed. The valve member is then either manually actuated or the resulting pressure of mud entering the top of the drill string causes the valve member to return to its first position, which allows the hose to be removed from the side bore, without substantial leakage of mud from the drill string.

The side bore may then be sealed permanently, for example by welding a plug onto the side bore, before this section of drill string is lowered into the well.

The drill string may also be provided with a side bore in what is known as a "pump in sub", which is used in the event of an emergency, for example to facilitate the provision of additional mud pressure required to control a sudden surge in well-bore pressure due to fluid inflow from a formation penetrated by the well entering the well in what is known as a "kick".

The present application relates to an improved connector for connecting the auxiliary mud hose to a side-bore in a drill pipe or pump in sub.

According to a first aspect of the invention we provide a drill pipe and connector assembly for connecting a hose to a side-bore of the drill pipe, the drill pipe having a wall enclosing a main bore, and the side-bore extending through the wall from the main bore to the exterior of the drill pipe, the connector comprising a hose connector body which forms a first end of the connector which is adapted to be connected to the hose, and a drill pipe connector body which forms a second end of the connector which connected is to the drill pipe, the connector having an exterior surface and an interior surface which encloses a bore extending from the first end of the connector to a second end of the connector, the drill pipe connector body being provided with at least one bayonet connector formation which extends from the exterior surface of the connector generally radially outwardly relative to the bore, the bayonet connector formation extending over less than half of the circumference of the exterior surface of the drill pipe connector body, wherein the drill pipe connector body is also provided with means for ensuring a substantially fluid tight seal between the connector and the surface of the drill pipe enclosing the side-bore.

Advantageously the drill pipe connector body may be rotated relative to the hose connector body, and the connector further includes means for providing a substantially fluid tight seal between the drill pipe connector body and the hose connector body. This assists a user in connecting the connector to the hose, before connecting the connector to the tubular, as the rotation of the drill pipe connector body required to engage the bayonet connector formations with the corresponding formations on the tubular can be achieved without having to rotate the hose connector body, and hence the hose, at the same time.

The drill pipe connector body may be secured relative to the hose connector body by means of a locking ring which extends around the exterior of the connector and has a first part which is provided with means for securing the locking ring to one of the hose connector body or the drill pipe connector body, and a second part which engages with a locking formation provided on the other of the hose connector body or drill pipe connector body to restrict or prevent translational movement of the hose connector body relative to the drill pipe connector body. In this case, the means for securing the locking ring to one of the hose connector body or drill pipe connector body may comprise a screw thread, and may also include one or more locking pins, which may or may not be threaded, each of which is located in an aperture extending through the first part of the locking ring, and which in use extend into a corresponding aperture provided in the connector body to which the locking ring is secured. It will be appreciated that the provision of such locking pins prevents the locking ring from coming unscrewed during use.

Preferably the drill pipe connector body is provided with a handle which is adapted to be grasped by a user to assist the user in rotating the drill pipe connector body relative to the hose connector body.

The connector may further be provided with locking means which is operable to engage with a drill pipe with which the or each bayonet connector formation of the drill pipe connector body is engaged to substantially prevent rotation of the drill pipe connector body with respect to the drill pipe.

The said locking means may include a threaded ring which is mounted around the exterior of the connector and engaged with a corresponding threaded portion of the exterior of the connector, and one or more elongate pins which extend generally perpendicular to the threaded ring towards the second end of the connector. In this case, the locking means may be provided with a handle which may be used to assist a user in screwing the threaded ring along the threaded portion of the exterior of the connector.

The drill pipe may be provided with a valve member, the valve member being movable between an open position in which flow of fluid along the side bore is permitted, and a closed position in which flow of fluid along the side bore is substantially prevented, and the connector may be provided with a valve actuating member which may comprise a rod which is extends from the bore of the connector to the exterior of the connector via an aperture in the connector, the valve actuating member being movable to engage with the valve member to move the valve member between the open position and the close position.

In this case, preferably the rod is provided with a screw thread which engages with a corresponding screw thread provided in the aperture in the connector.

Advantageously, the or each bayonet connector formation is engaged with a corresponding engagement formation provided in the wall of the drill pipe surrounding the side bore so that translational movement of the drill pipe connector body relative to the drill pipe is restricted or prevented.

The or each engagement formation preferably comprises a lip formation which extends radially inwardly from the wall enclosing the side bore into the side bore, around only part of the circumference of the wall enclosing the side bore, and along only part of the depth of the wall enclosing the side bore, the depth being the distance between the exterior of the tubular and the main bore.

Preferably there are the same number of engagement formations as there are bayonet connector formations provided on the drill pipe connector body of the connector.

The height of the bayonet connector formations is such that the maximum diameter of the second end of the connector is less than the maximum internal diameter of the side bore. Moreover, the height of the lip formations is such that the maximum diameter of the second end of the connector is greater than the minimum internal diameter of the side bore.

Where one engagement formation is provided, the gap between end portions of the engagement formation is large enough for the bayonet connector formation or formations to pass through the gap between the ends of the engagement formation. Where more than one engagement formation is provide, the separation of end portions of adjacent engagement formations is large enough one or more bayonet connector formation or formations to pass through the gap between the ends of the adjacent engagement formations.

According to a third aspect of the invention we provide a method of mounting a connector according to the first aspect of the invention between a hose and a tubular, the tubular having a wall enclosing a main bore, and the side-bore extending through the wall from the main bore to the exterior of the tubular, the method including the steps of:

securing hose connector body on the hose so that flow of fluid from the hose into the bore of the connector is permitted, either before or after which, securing the drill pipe connector body to the hose connector body, then, rotating the drill pipe connector body relative to the hose connector body and the tubular so as to bring the drill pipe connector body into a first angular orientation with respect to the tubular;

then inserting the second end of the connector into the side bore and rotating the drill pipe connector body relative to the hose connector body and the tubular to bring drill pipe connector body into a second angular orientation with respect to the tubular in which at least one bayonet connector formation engages with corresponding bayonet engagement formation provided around the side-bore of the tubular, the engagement of the bayonet connector formation with the bayonet engagement formation preventing removal of the drill pipe connector body from the side bore.

The step of securing the drill pipe connector body to the hose connector body may comprise engaging the drill pipe connector body with the hose connector body, mounting a locking ring around the exterior of the connector and securing a first part of the locking ring to one of the hose connector body or the drill pipe connector body such that a second part engages with a locking formation provided on the other of the hose connector body or the drill pipe connector body to restrict or prevent translational movement of the hose connector body relative to the drill pipe connector body.

Preferably the method further includes the step of, after rotation of the drill pipe connector body to the second orientation, operating a locking means so that the locking means comes into engagement with the tubular to substantially prevent further rotation of the drill pipe connector body with respect to the tubular.

The method may further include the step of, after rotation of the drill pipe connector body to the second orientation, operating a valve actuating member to move a valve member provided in the side bore of the tubular from a closed position to an open position.

According to a fourth aspect of the invention we provide a connector for connecting a hose to a side-bore of a tubular, the tubular having a wall enclosing a main bore, and the side-bore extending through the wall from the main bore to the exterior of the tubular, the connector comprising a hose connector body which forms a first end of the connector which is adapted to be connected to the hose, and a drill pipe connector body which forms a second end of the connector which is adapted to be connected to the tubular, the connector having an exterior surface and an interior surface which encloses a bore extending from the first end of the connector to a second end of the connector, wherein the connector is provided with a valve actuating member which extends into the drill pipe connector body and which may be operated when the connector is connected between a hose and a tubular to move between a first position and a second position.

The valve actuating member may comprise a rod which extends from the bore of the connector to the exterior of the connector via an aperture in the connector.

Preferably the movement of the valve actuating member from the first position to the second position comprises translational movement towards the second end of the connector.

Where the valve actuating member is a rod, the rod may be provided with a screw thread which engages with a corresponding screw thread provided in the aperture in the connector.

Figure 2:
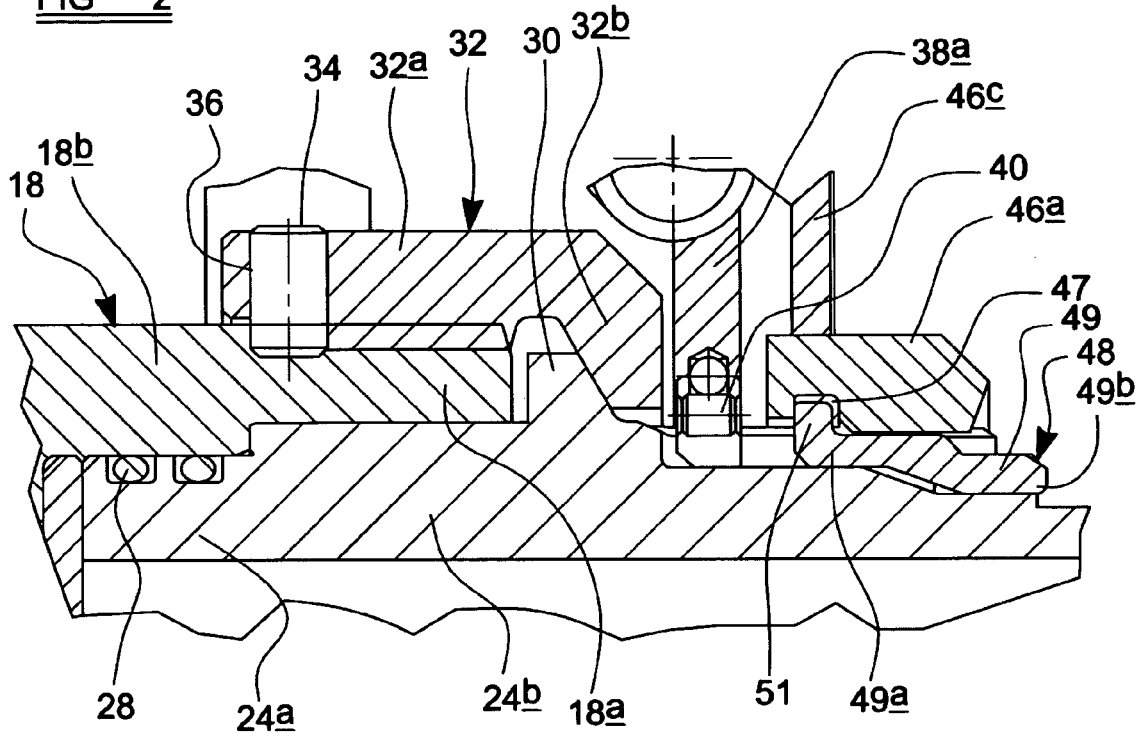
Figure 3:
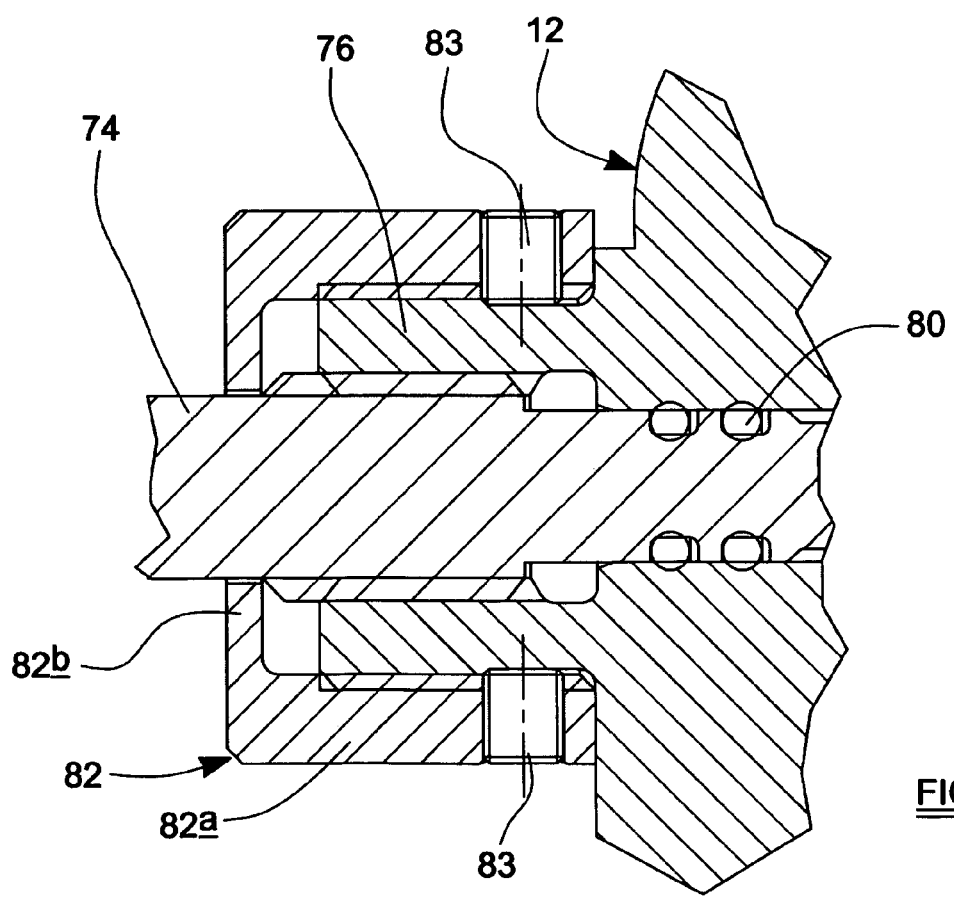
Figure 4:
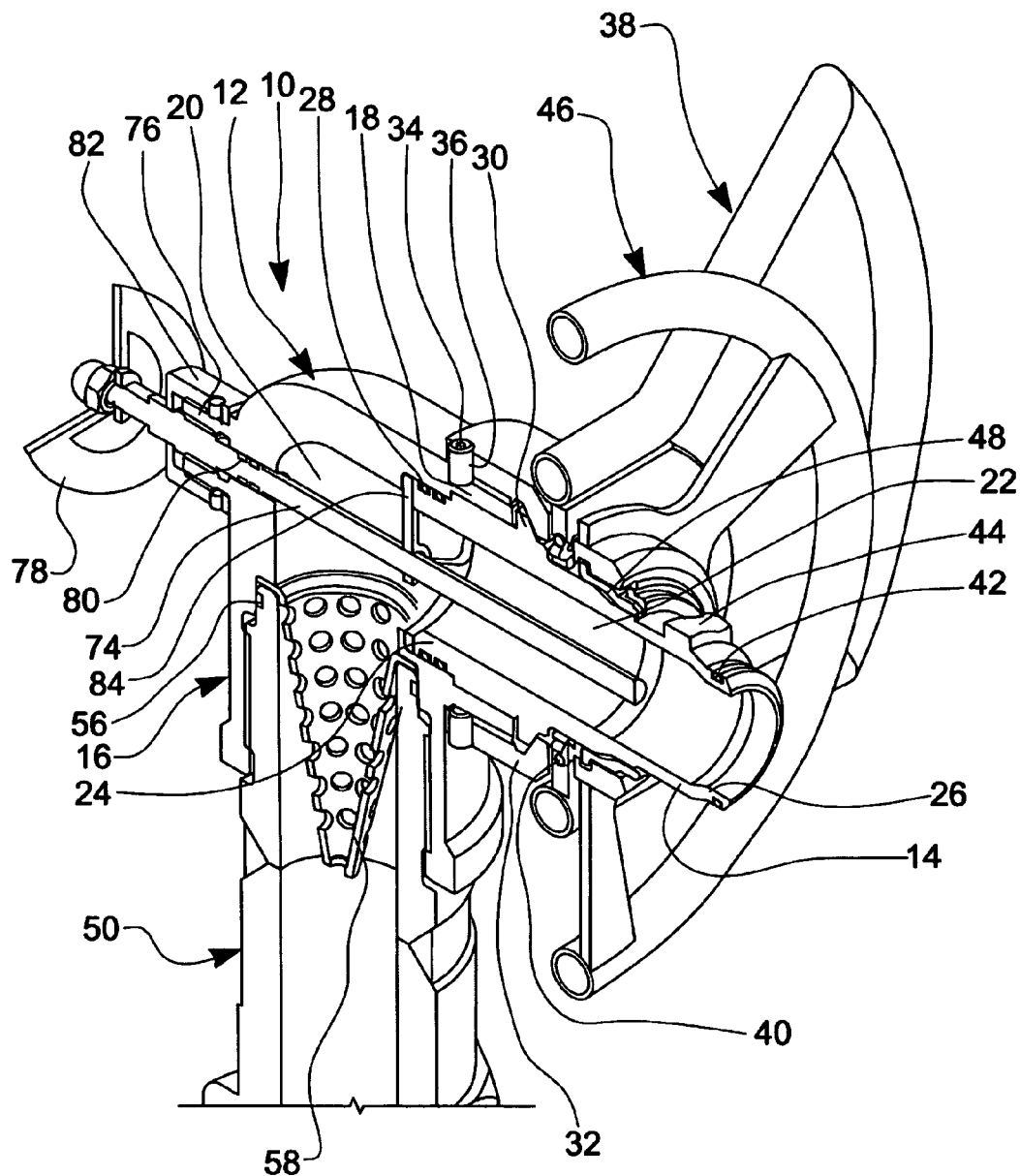
Figure 5:
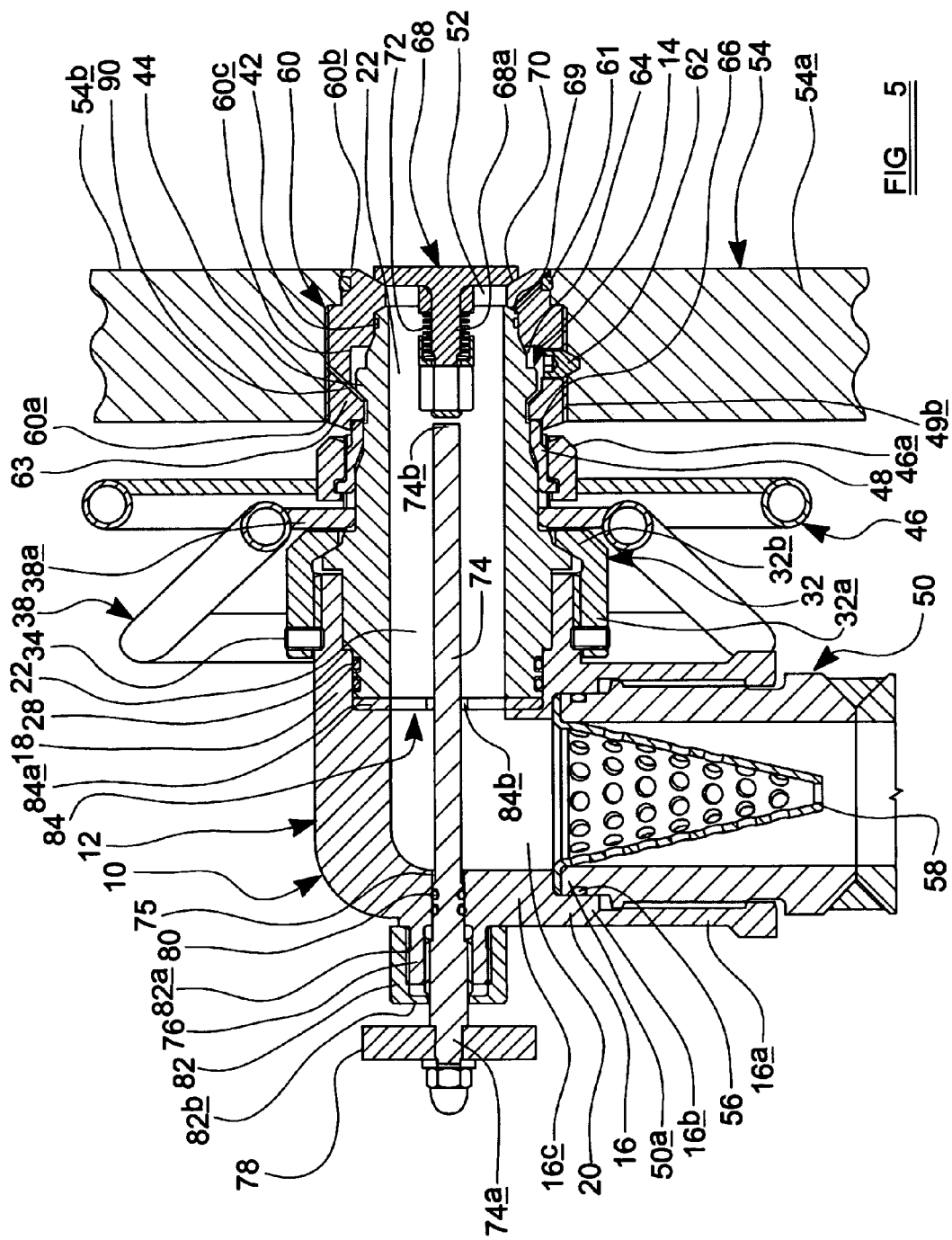
Figure 6:
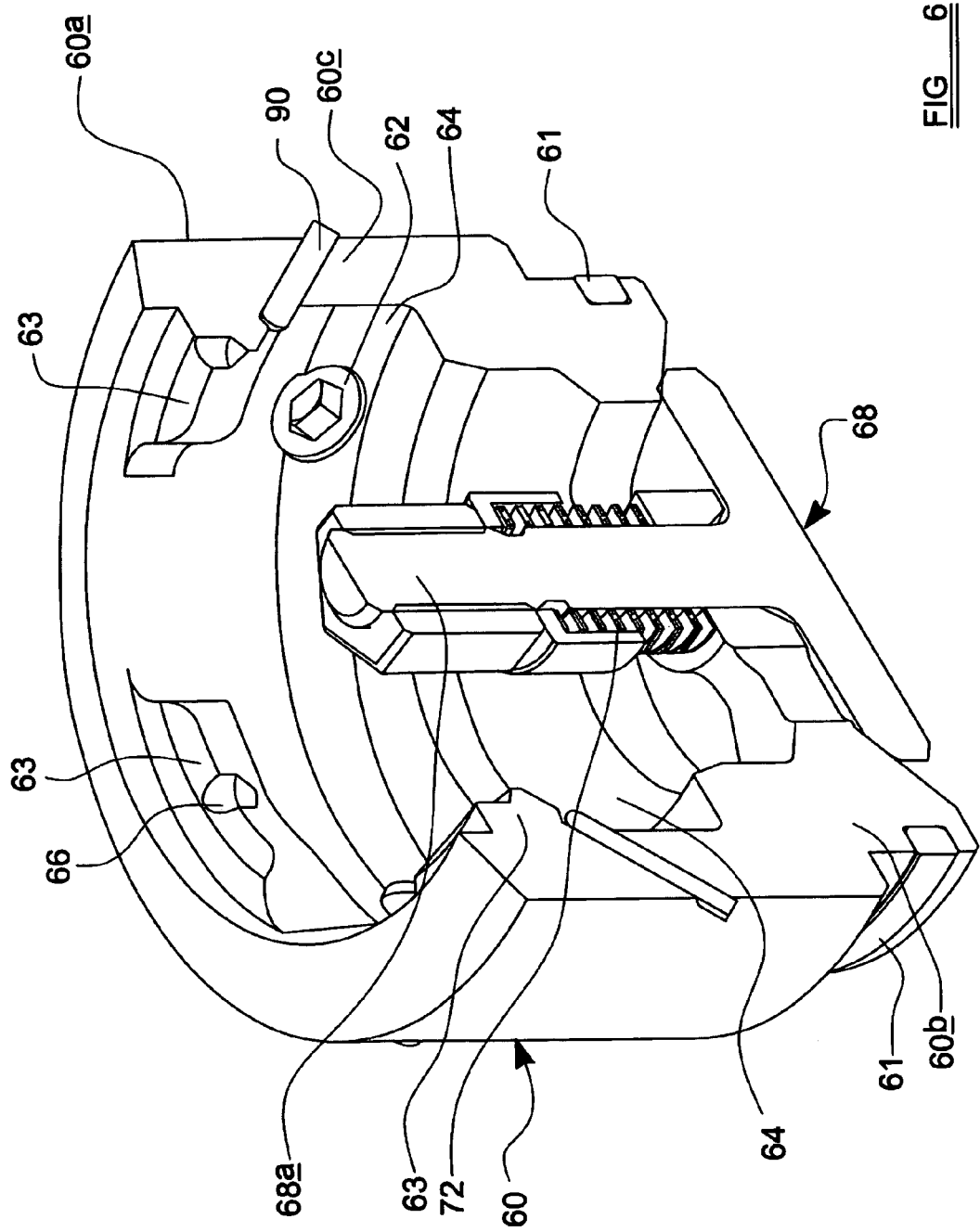
Figure 7:
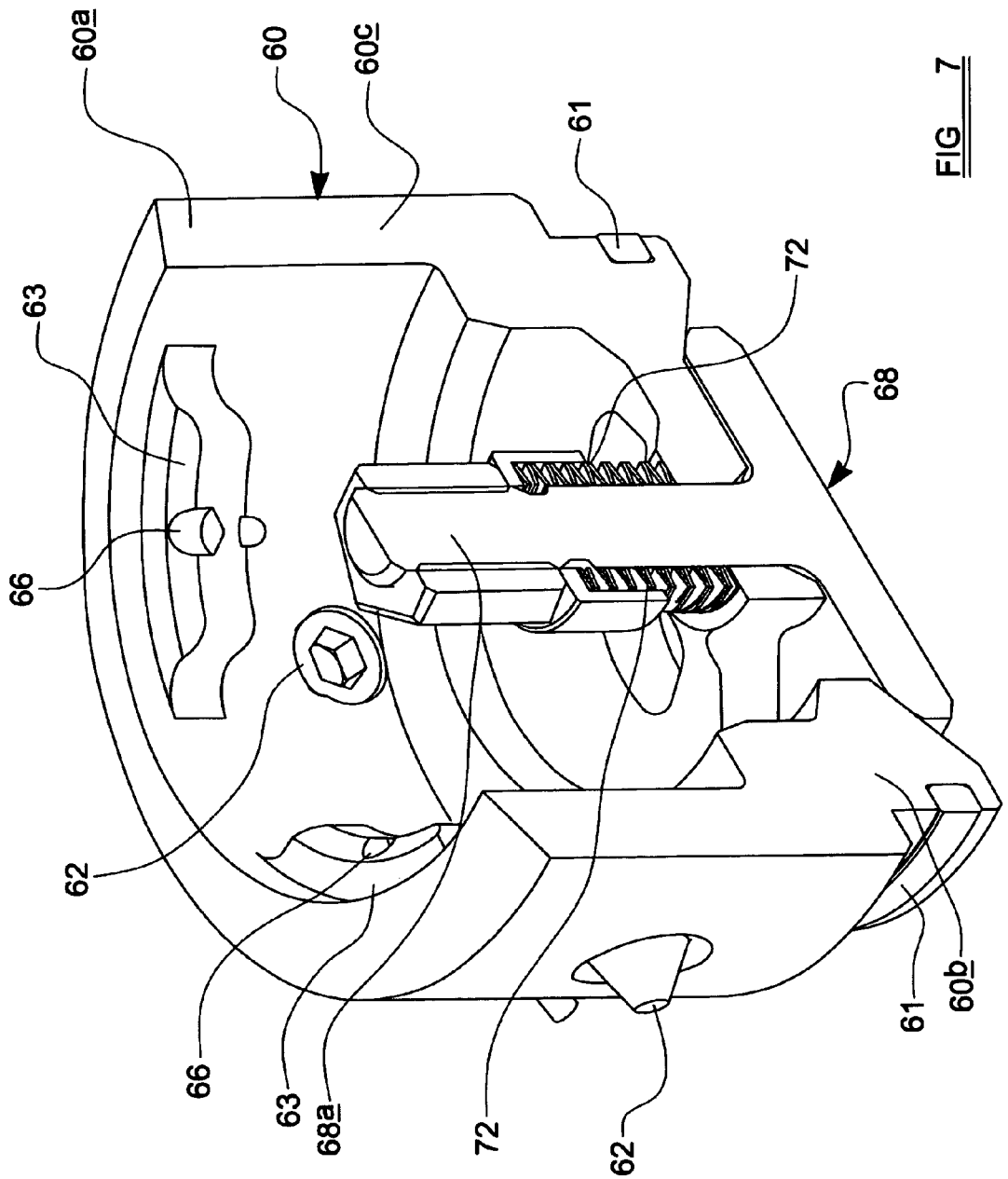

An embodiment of the invention will now be described, by way of example only, with reference to the following figures, of which FIG. 1 shows a cross-section through a connector according to the invention, FIG. 2 shows in detail the portion of the connector labelled A in FIG. 1, FIG. 3 shows in detail the portion of the connector labelled B in FIG. 1, FIG. 4 shows a perspective view of a cross-section through the connector shown in FIG. 1 along with a portion of hose to which the connector is connected, FIG. 5 shows a cross-section through the connector shown in FIG. 1, and a portion of hose and tubular to which the connector is connected, FIG. 6 shows a perspective view of a first cross-section through the insert shown in FIG. 5; and FIG. 7 shows a perspective view of a second cross-section through the insert shown in FIG. 5.

Referring now to FIGS. 1 to 4, there is shown a connector 10 which comprises a hose connector body 12 and a drill pipe connector body 14. The hose connector body 12 is L-shaped, and has a tubular internally threaded end 16 and a tubular externally threaded end 18, both of which are generally circular in transverse cross-section. The hose connector body 12 is therefore provided with a main bore 20 which extends from the internally threaded end 16, bends through around 90° to the externally threaded end 18.

The internal diameter of internally threaded end 16 of the hose connector body 12 is stepped, so that the diameter of the main bore 20 decreases from a maximum value at an end portion 16a of the internally threaded end 16, to an intermediate value at an intermediate portion 16b, and to a minimum value at an inner portion 16c. A generally helical screw threaded is provided over a substantial proportion of the length of the internal surface of the end portion 16a. Similarly, the internal diameter of externally threaded end 18 of the hose connector body 12 is stepped, so that the diameter of the main bore 20 decreases from the maximum value at an end portion 18a of the internally threaded end 18, to a second intermediate value at an intermediate portion 18b, and to the minimum value at an inner portion 18c. A generally helical screw thread is provided over a substantial proportion of the length of the external surface of the end portion 18a.

The drill pipe connector body 14 is also tubular, and encloses a generally cylindrical central bore 22, which, unlike the main bore 20 in the hose connector body 12 is substantially straight, the diameter of the central bore 22 of the drill pipe connector body 14 being substantially the same as the minimum diameter of the main bore 20 in the hose connector body 12. The drill pipe connector body 14 has a first end 24, which is connected to the hose connector body 12, and a second end 26 which is adapted to be connected to a portion of drill pipe or pump in sub. The internal diameter of the drill pipe connector body 14 is substantially constant along its entire length, whilst the external diameter varies along the length of the body 14.

The external diameter of the drill pipe connector body 14 at an end portion 24a of its first end 24 is just marginally smaller than the internal diameter of the intermediate portion 18b of the externally threaded end 18 of the hose connector body 12, and is provided with two circumferential grooves in its outer surface in each of which is located an O-ring 28. The external diameter of the drill pipe connector body 14 undergoes a step increase to a first intermediate portion 24b, being just marginally smaller than the internal diameter of the end portion 18a of the externally threaded end of the hose connector body 12. It will therefore be appreciated that, when the first end 24 of the drill pipe connector body 14 is inserted into the externally threaded end 18 of the hose connector body 12, the extent to which the drill pipe connector body 14 can extend into the hose connector body 12 is limited by engagement of the step between the end portion 18a and intermediate portion 18b of the externally threaded end 18 of the hose connector body 12, with the step between the end portion 24a and first intermediate portion 24b of the first end 24 of the drill pipe connector body 24. Moreover, engagement of the O-rings 28 with the internal face of the intermediate portion 18b of the externally threaded end 18 of the hose connector body 12 provides a substantially fluid tight seal between the hose connector body 12 and the drill pipe connector body 14.

Moving along the drill pipe connector body 14 from its first end 24 towards its second end 26, after the first intermediate portion 24b, there is a second intermediate portion 24c which is provided with a locking flange 30 which extends radially outwardly of the drill pipe connector body 14. The locking flange 30 is engaged with a locking ring 32 which has an internally threaded portion 32a which is provided with a generally helical screw thread which is engaged with the corresponding screw thread provided on the end portion 18a of the externally threaded end 18 of the hose connector body 12. The locking ring 32 is also provided with a radially inwardly extending locking flange 32b which engages with the locking flange 30 of the drill pipe body 14 so that the locking flange 30 of the drill pipe connector body 14 is trapped between the locking flange 32b of the locking ring 32 and the screw threads, and removal of the drill pipe body 14 from the hose connector body 12 is prevented, whilst rotation of the drill pipe connector body 14 relative to the hose connector body 12 is permitted. Rotation of the locking ring 32 relative to the hose connector body 14 is prevented by means of two grub screws 34 which each extend through a threaded aperture 36 provided in the locking ring 32 into a corresponding aperture provided in the end portion 18a of the externally threaded end 18 of the hose connector body 12.

Continuing along the exterior surface of the drill pipe connector body 14 towards its second end 26, a handle assembly 38, comprising an annular mounting part 38a from which extends two diametrically opposite handle parts 38b, is secured to the drill pipe connector body 14. In this example, the handle assembly 38 is secured to the drill pipe connector boy 14 by means of a screw thread connection between a screw thread provided on the radially inwardly facing surface of the mounting part 38a and a corresponding first screw thread provided on the exterior surface of the drill pipe connector body 14. The handle assembly 38 is provided to assist a user in rotating the drill pipe connector body 14 relative to the hose connector body 12, and so to lock the handle assembly 38 in place so that it cannot rotate relative to the drill pipe connector body 14, a arrangement of a plurality of grub screws 40 and ball bearings are provided. This is best illustrated in FIG. 2.

The exterior surface of second end 26 of the drill pipe connector body 14 is provided with a circumferential groove in which is located a further O-ring 42. Moving along the drill pipe connector body 14 from its second end 26 towards its first end 24, there are provided a plurality of bayonet connector formations 44 which extend radially outwardly from the exterior surface of the drill pipe connector body 14. In this example, four such bayonet connector formations 44 are provided, and these are spaced regularly around the outer circumference of the drill pipe connector body 14, occupying in total a little less than half of the outer circumference of the drill pipe connector body 12.

Finally, around the exterior surface of the drill pipe connector body 14, between the handle assembly 38 and the bayonet connector formations 44 is provided a torque wheel 46 which comprises a central generally annular mounting part 46a which is connected to a generally annular handle part 46b by means of a plurality of radial spokes 46c. The radially inwardly facing surface of the mounting part 46a of the torque wheel 46 is provided with a generally helical screw thread which is engaged with a corresponding screw thread provided on to the outer surface of the drill pipe connector body 14. The radially inwardly facing face of the mounting part 46a of the torque wheel 46 is also provided with a groove 47 which extends around the inner circumference of the mounting part 46a. The screw thread on the exterior surface of the drill pipe connector body 14 which engages with the mounting part 46a of the torque wheel 46 is also provided with the a number of axially extending slots, the slots each receiving a locking pin 48. In the example, four locking pins and slots are provided.

The locking pins 48 are generally L-shaped, i.e. have an elongate main body 49 from a first end 49a of which extends a relatively short tip portion 51 at approximately right angles to the main body 49. The main body 49 of each locking pin 48 is located in one of the slots in the drill pipe connector body 14, which the tip portion 51 is located in the groove 47. It will therefore be appreciated that rotation of the torque wheel 46 relative to the drill pipe connector body 14 will cause the locking pins 48 to move axially relative to the drill pipe connector body 14.

Referring now to FIG. 5, the connector 10 described above is shown providing a connection between a hose 50 and a side bore 52 in a section of drill pipe 54. The end 50a of the hose 50 is located in the internally threaded end 16 of the hose connector body 12 of the connector 10, and is provided with an external generally helical screw thread which engages with the screw thread of the internally threaded end 16. Sealing means is provided to ensure a substantially fluid tight seal between the hose 50 and the connector 10. In this example, this comprises an O-ring 56 which is located in a circumferential groove provided in the exterior surface of the end 50a of the hose 50. In this example, a conical perforated screen 58 is clamped between the end 50a of the hose 50 and step between the intermediate portion 16b and the inner portion 16c of the internally threaded end 16 of the hose connector body 12. This screen 58 is provided to prevent large clumps of mud or debris from being pumped into the drill pipe 54.

Other means may be provided to secure the hose 50 to the connector 10, of course.

The drill pipe 54 is provided with a tubular wall 54a which encloses a generally cylindrical main bore 54b. The side bore 52 extends through the wall 54a generally perpendicular to the main bore 54b, connecting the main bore 54b to the exterior of the pipe 54, and is provided with a generally tubular insert 60. Sealing means is provided between the insert 60 and the drill pipe wall 54a to ensure a substantially fluid tight seal between the insert 60 and the drill pipe 54. In this example, the sealing means comprises an O-ring 61 located in a circumferential groove around the insert 60 which lies between the screw thread and the main bore 54b of the drill pipe 54. The insert 60 is illustrated in isolation in FIGS. 7 and 8.

Once the insert 60 is in place, four locking studs 62 are inserted through apertures 60a spaced generally regularly around the insert 60 into corresponding apertures provided in the drill pipe wall 54a. It will be appreciated that these prevent further movement of the insert 60 relative to the drill pipe 54, and therefore ensure that the insert 60 remains in position during use. It should be appreciated that, in addition to or instead of providing locking studs 62, the insert 60 may be secured to drill pipe 54 by means of an external screw thread which engages with a corresponding screw thread provided in the drill pipe wall 54a. It should also be appreciated that, whilst it is convenient for the purposes of ease of manufacture, it is not necessary for there to be a separate insert 60, and all the features of the insert 60 may be integrally provided in the drill pipe wall 54a.

The second end 26 of the drill pipe connector body 14 is located within the side bore 52 of the drill pipe 54, the O-ring 42 engaging with the interior surface of the insert 60 to provide a substantially fluid tight seal between the drill pipe 54 and the connector 10. The interior surface of the insert 60 is configured to engage with the bayonet connector formations 44 of the drill pipe connector body 14 so as to retain the connector 10 in sealed engagement with the drill pipe 54.

The interior surface of the insert 60 at the first end 60a of the insert adjacent the exterior surface of the drill pipe wall 54a is provided with four lip formations 63 which extend radially inwardly of the insert 60 into the side bore 52. The lip formations 63 are regularly spaced around the insert 60, and extend around approximately half of the inner circumference of the insert 60 in total. The lip formations 63 do not extend along the entire axial extent of the insert 60, however, and in this example, extend from the exterior end 60a of the insert 60 only around a quarter of the way to the interior end 60b of the insert 60. A central portion 60c, between the first end 60a and second end 60b of the insert 60, has a greater internal diameter than the second end 60b of the insert 60, and therefore four recesses 64 are provided between the lip formations 63 and the second end 60b of the insert 60. The bayonet connector formations 44 provided on second end 26 of the drill pipe connector body 14 of the connector 10 are located in these recesses 64, and as the external diameter of the bayonet connector formations 44 is greater than the separation of interior edges of opposite lip formations 63, engagement of each of the bayonet connector formations 44 with the adjacent lip formation 63 prevents the connector 10 from being pulled out of the side bore 52, providing that there is no rotation of the drill pipe connector body 14 relative to the insert 60.

Rotation of the drill pipe connector body 14 relative to the insert 60 is prevented by the engagement of the locking pins 48 with the insert 60. Specifically, the lip formations 63 at the first end 60a of the insert 60 are each provided with a locking bore 66 into which the second end 49a of the locking pin 48 extends. Each locking bore 66 comprises a discrete aperture which extends axially into the lip formation 63 from the first end 60a of the insert towards the second end 60b of the insert 60. It will be appreciated, therefore, that engagement of the locking pins 48 with the walls of the locking bores 66 prevents rotation of the drill pipe connector body 14 relative to the insert 60, and hence also prevents removal of the connector 10 from the side bore 52 in the drill pipe 54.

The steps taken to use the connector 10 to connect the hose 50 to the side bore 52 of the drill pipe 54 are set out as follows:

With the screen 58 located at the end 50a of the hose 50, the internally threaded end 16 of the hose connector body is screwed on to the external screw thread provided on the end 50a of the hose 50. The hose connector body 12 is thus secured on the hose 50.

The first end 24 of the drill pipe connector body 14 is then inserted into the externally threaded end 18 of the hose connector body 12, and the first locking ring 32 inserted over the second end 26 of the drill pipe connector body 14, the threaded portion 32a of the locking ring 32 extending towards the hose connector body 12 relative to the locking flange 32b. The screw thread of the threaded portion 32a of the locking ring 32 is screwed on to the external screw thread provided on the externally threaded end 18 of the hose connector body 12 until the locking flange 32b of the locking ring 32 engages with the locking flange 30 on the drill pipe connector body 14, and each of the apertures 36 in the locking ring 32 is aligned with a corresponding aperture in the external screw thread of the hose connector body 12. A grub screw 40 is then screwed into each of the apertures 36 to prevent further rotation of the locking ring 32 relative to the hose connector body 12. The drill pipe connector body 14 is thus secured on the hose connector body 12 and hose 50.

The handle 38 is then mounted on the second end 26 of the drill pipe connector body 14, and moved towards the first end 24 until the screw thread on the mounting part 38a engages with the first screw thread provided on the drill pipe connector body 14. The handle 38 is rotated relative to the drill pipe connector body 14 until the screw threads are fully meshed, and the grub screws 40 screwed into place to lock the handle 38 relative to the drill pipe connector body 14.

The torque wheel 46 is then mounted on the second end 26 of the drill pipe connector body 14, the four locking pins 48 being positioned each with their tip portion 51 in the groove 47 and moved towards the first end 24 until each of the locking pins 48 is aligned with one of the slots in the second screw thread provided on the drill pipe connector body 14, and this screw thread engages with the screw thread provided on the mounting part 46a of the torque wheel 46. The torque wheel 46 is rotated relative to the drill pipe connector body 14 until the screw threads are fully meshed, and the locking pins 48 drawn back as far from the second end 26 of the drill pipe connector body 14 as possible.

The hose 50 and connector 10 are then moved towards the side bore 52 in the drill pipe 54. In order to insert the second end 26 of the drill pipe connector body 14 into the side bore 52, a user uses the handle part 38b of the handle 38 to rotate the drill pipe connector body 14 relative to the hose connector body 12 and to the drill pipe 54, until each of the bayonet connector formations 44 of the drill pipe connector body 14 are aligned with a gap between adjacent lip formations 63 of the insert 60. The user then slides the second end 26 of the drill pipe connector body 14 into the side bore 52 until the very end of the drill pipe connector body 14 engages with a stop 69 provided on the interior surface of the insert 60. In this example, the stop 69 comprises a shoulder between the larger internal diameter central portion 60c and the smaller internal diameter second end 60b of the insert. At this point, the O-ring 42 provided in the second end 26 of the drill pipe connector body 14 engages and provides a substantially fluid tight seal with the insert 60.

Once this has been accomplished, the user uses the handle 38 to rotate the drill pipe connector body 14 again, so that the bayonet connector formations 44 move around the central portion 60c of the insert 60 until they are aligned with the lip formations 63, specifically, in this example until around half of each bayonet connector formation 44 is engaged with a portion of one of the lip formations 63. Rotation of the drill pipe connector body 14 past this point is prevented by means of a mechanical stop, which, in this example comprises a bayonet pin 90 which extends through an aperture provided in the insert 60 from the exterior of the insert 60, diagonally upwardly to the interior of the insert 60 to a generally central point on the lowermost surface of one of the lip formations 63. One such pin 90 is provided for each lip formation 63. The bayonet connector formations 44 are then trapped by the lip formations 63, and it is no longer possible to slide the drill pipe connector body 14 out of the side bore 52.

To prevent further rotation of the drill pipe connector body 14 relative to the drill pipe 54, the user rotates the torque wheel 46 so that engagement of the screw threads by means of which the torque wheel 46 is retained on the drill pipe connector body 14 causes the torque wheel 46 to move towards the drill pipe 54. This pushes the locking pins 48 towards the insert 60, and, if the drill pipe connector body 14 is correctly aligned relative to the insert 60, each locking pin 48 is pushed into one of the locking bores 66. If rotation of the torque wheel 46 is prematurely stopped because the locking bores 66 are not in alignment with the locking pins 48, this indicates to the user that the bayonet connector formations 44 are not properly engaged with the lip formations 63, and that further rotation of the drill pipe connector body 14 is required to bring it into correct alignment with the insert 60.

When the locking pins 48 are correctly located in the locking bores 66, the end of the torque wheel mounting part 46a bears on the insert 60, thus further assisting in securing the connector 10 relative to the drill pipe 54.

This completes the connection process. The hose 50 may be disconnected from the drill pipe 50 simply by reversing these steps.

Whilst it will be appreciated that the connector 10 and method described above could be used to connect a hose to an open bore, in a preferred use of the connector 10, the side bore 52 is provided with a valve member 68 which is movable between an open position in which flow of fluid along the side bore 52 is permitted, and a closed position in which flow of fluid along the side bore 52 is substantially prevented. The insert 60 is provided with a valve seat 70 with which the valve member 68 engages when in the closed position, engagement of the valve member 68 with the valve seat 70 providing a substantially fluid tight seal which closes the side bore 52 to flow of fluid.

The valve member 68 is biased into the closed position by means of a resilient biasing means, in this example a helical coil spring 72.

When the hose 50 is a drilling mud hose which is intended to be used to maintain flow of mud down the drill pipe 54 during the process of adding a new section of drill pipe to the drill string as described in the introduction above, it is desirable to avoid pressure spikes in the drill pipe 54.

The valve member 68 is preferably configured, as in this example, such that the surface area of the valve member 68 exposed to the pressure in the hose 50 is approximately equal to or less than the surface area of the valve member 68 exposed to the fluid pressure in the drill pipe 54. This means that when the fluid pressure in the hose 50 is approximately equal to the mud pressure in the drill pipe 54, for example when mud is supplied to the drill pipe 54 and the hose 50 by the same mud pump, the force exerted on the valve member 68 by the fluid pressure in the hose 50 tending to move the valve member 68 against the biasing force of the spring 72 to the open position is less than the force exerted on the valve member 68 by the fluid pressure in the drill pipe 54 maintaining the valve member 68 in the closed position. This is desirable as it prevents the valve member 68 from opening prematurely, after the hose 50 has been connected, but before the valve controlling supply of fluid from the pump to the main bore 54b of the drill pipe 54 is closed.

Once this valve is closed, as the mud pump is now only supplying mud to the hose 50, the fluid pressure supplied by the hose 50, until it exceeds the fluid pressure in the drill pipe 54 by an amount sufficient to move the valve member 68 from the closed position to the open position, and to allow flow of fluid from the hose 50 into the drill pipe 54. Significant pressure build up may be required to do this, and this can result in an undesirable pressure spike in the drill pipe 54 when the valve member 68 first opens.

To avoid this, it is desirable to provide a valve opening means which provides a mechanical means of moving the valve member 68 from the closed position to the open position, before the pressure build up in the hose 50 is too great.

In this example, the valve opening means comprises an actuating member 74, in this case a generally straight rod, which extends along the central bore 22 of the drill pipe connector body 14 into the main bore 20 of the hose connector body 12, and through an auxiliary bore 75 in the hose connector body 12 to the exterior of the connector 10. In order to substantially prevent fluid from leaking out of the connector 10 through the auxiliary bore 75, sealing means is provided to maintain a substantially fluid tight seal between the rod 74 and the hose connector body 12, whilst allowing sliding movement of the rod 74 relative to the hose connector body 12. In this example the sealing means comprises two O-rings 80 each of which is located in a circumferential groove provided around the rod 74.

As is best illustrated in FIG. 3, the rod 74 is also provided with a generally helical screw thread which engages with a correspondingly internally threaded extension 76 of the hose connector body 12 which extends outwardly of the hose connector body 12 around the rod 74. A handle part 78 is secured to the external end 74a of the rod 74 in order to assist a user in rotating the rod 74 to screw it into or out of the connector 10. In order to prevent a user from completely unscrewing the rod 74 from the hose connector body 12, a retainer cap 82 is mounted on the portion of the rod 74 which is external to the connector 10, the retainer cap 82 having a tubular side wall 82a on an internal surface of which is provided a screw thread which is engaged with a corresponding screw thread provided on the external surface of the extension 76. The retainer cap 82 may be locked in place by means of one or more grub screws 83 (for clarity, illustrated in FIG. 3 only) each of which is screwed into a threaded aperture provided in the sidewall 82a and into a corresponding aperture provided in the extension 76.

The rod 74 extends through an aperture in an end face 82b of the retainer cap 82, the end face 82b of the retainer cap 82 lying between the screw thread of the rod 74 and the handle part 78. The aperture has a smaller diameter than the screw thread of the rod 74, and therefore the end face 82b acts as a stop with engagement of the screw thread with the end face 82b setting a limit on how far the rod 74 can be unscrewed from the hose connector body 12.

In order to provide additional support for the rod 74, in this embodiment of the invention a rod support 84 is provided. The rod support 84 comprises a small diameter central annulus 84a which is supported by a plurality of spokes, in this example three, by a larger diameter outer annulus 84b. The outer annulus 84b is clamped between the first end 24 of the drill pipe connector body 14 and the shoulder between the inner portion 18c and the intermediate portion 18b of the externally threaded end 18 of the hose connector body 12, and the rod 74 extends through the inner annulus 84b so that the inner annulus 84b provides additional support for the rod 74.

The valve member 68 is provided with a stem 68a which extends into the central bore 22 of the drill pipe connector body 14, and which engages with the second end 74b of the rod 74 when the rod 74 is screwed into the hose connector body 12. By continuing to screw the rod 74 into the hose connector body 12 after the initial engagement of the rod 74 with the valve stem 68a, the valve member 68 is pushed against the biasing force of the spring 72 out of engagement with the valve seat 70, i.e. to the open position in which flow of fluid along from the hose 50 to the drill pipe 54 is permitted.

It will be appreciated that various modifications may be made to the connector 10 whilst retaining the connector 10 within the scope of the invention. In the above example, O-rings are used in various places to provide a substantially fluid tight seal between two adjacent relatively movable parts. It will be appreciated that alternative sealing means may be used including chevron seals, lip seals, metal-to-metal seals etc. It should also be appreciated that whilst in this embodiment of the invention, four bayonet connector formations 44 are provided, this need not be the case, and more or fewer may be provided, as long as the insert 60 is provided with at least one lip formation 63 for each bayonet connector formation 44, and the bayonet connector formations do not extend over more than half of the circumference of the drill pipe connector body 14 in total. Whilst it is preferably in terms of the strength of the connection for the bayonet connector formations to extend over around half of the circumference of the drill pipe connector body 14, they may extend over significantly less than half.

Similarly, whilst in this example, the connector 10 is provided with four locking pins 48, more or fewer (and not necessarily the same number as the number of bayonet connector formations 44) may be used, again, as long as the insert 60 is provided with at least one locking bore 66 for each locking pin 48.

Whilst in this example the connector 10 forms an L-shaped tube, thus allowing the hose 50 to be generally parallel to the drill pipe 54, this need not be the case, and the hose connector body 12 may be generally straight, or bent at an angle other than 90°, depending on the orientation of the hose 50 relative to the drill pipe 54.

In this example, the locking ring 32 is screwed onto the hose connector body 12 and engages with a locking flange 30 provided on the drill pipe connector body 12. It will be appreciated, however, that this may be reversed and the locking ring 32 engaged with a screw thread provided on the drill pipe connector body 14 and a locking flange provided on the hose connector body 12.

Although in this example, movement of the rod 74 required to actuate the valve member 68 is achieved using a screw thread, the rod 74 could equally be driven by other means, such as a cam. Motor means may also be provided to drive movement of the rod 74, rather than this being carried out manually. Moreover, whilst in this example, the rod 74 is retained using an externally mounted cap 82, it can be retained using alternative means located inside the connector 10.

Whilst in this example, the connector 10 is described as connecting a side bore in a drill pipe 54 to a hose 50, it should be appreciated that it could equally be used to connect a hose 50 to a side bore in any other type of tubular including, but not limited to, pump in subs, casing, and production tubing.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A drill pipe and connector assembly for connecting a hose to a side-bore of the drill pipe, the drill pipe having a wall enclosing a main bore, and the side-bore extending through the wall from the main bore to the exterior of the drill pipe, the connector comprising a hose connector body which forms a first end of the connector which is adapted to be connected to the hose, and a drill pipe connector body which forms a second end of the connector which is connected to the drill pipe, the connector having an exterior surface and an interior surface which encloses a bore extending from the first end of the connector to a second end of the connector, the drill pipe connector body being provided with at least one bayonet connector formation which extends from the exterior surface of the drill pipe connector body generally radially outwardly relative to the bore, the bayonet connector formation being rotationally and axially fixed relative to the drill pipe connector body and extending over less than half of the circumference of the exterior surface of the drill pipe connector body, wherein the drill pipe connector body is also provided with a seal which is mounted on the drill pipe connector body for ensuring a substantially fluid tight seal between the connector and the surface of the drill pipe enclosing the side-bore.

2. An assembly according to claim 1 wherein the drill pipe connector body may be rotated relative to the hose connector body, and the connector further includes means for providing a substantially fluid tight seal between the drill pipe connector body and the hose connector body.

3. An assembly according to claim 1 wherein the drill pipe connector body is secured relative to the hose connector body by means of a locking ring which extends around the exterior of the connector and has a first part which is provided with means for securing the locking ring to one of the hose connector body or the drill pipe connector body, and a second part which engages with a locking formation provided on the other of the hose connector body or drill pipe connector body to restrict or prevent translational movement of the hose connector body relative to the drill pipe connector body.

4. An assembly according to claim 3 wherein the means for securing the locking ring to one of the hose connector body or drill pipe connector body comprises a screw thread.

5. An assembly according to claim 4 wherein the means for securing the locking ring to the hose connector body or drill pipe connector body includes one or more locking pins, which may or may not be threaded, each of which is located in an aperture extending through the first part of the locking ring, and which in use extend into a corresponding aperture provided in the connector body to which the locking ring is secured.

6. An assembly according to claim 2 wherein the drill pipe connector body is provided with a handle which is adapted to be grasped by a user to assist the user in rotating the drill pipe connector body relative to the hose connector body.

7. An assembly according to claim 1 wherein the connector is further provided with locking means which is operable to engage with the drill pipe with which the or each bayonet connector formation of the drill pipe connector body is engaged to substantially prevent rotation of the drill pipe connector body with respect to the drill pipe.

8. An assembly according to claim 7 wherein the said locking means includes a threaded ring which is mounted around the exterior of the connector and engaged with a corresponding threaded portion of the exterior of the connector, and one or more elongate pins which extend generally perpendicular to the threaded ring towards the second end of the connector.

9. An assembly according to claim 8 wherein the locking means is provided with a handle which may be used to assist a user in screwing the threaded ring along the threaded portion of the exterior of the connector.

10. An assembly according to claim 1 wherein the drill pipe is provided with a valve member, the valve member being movable between an open position in which flow of fluid along the side bore is permitted and a closed position in which flow of fluid along the side bore is substantially prevented, and the connector is provided with a valve actuating member which comprises a rod which extends from the bore of the connector to the exterior of the connector via an aperture in the connector, the valve actuating member being movable to engage with the valve member to move the valve member between the open position and the closed position.

11. An assembly according to claim 10 wherein the rod is provided with a screw thread which engages with a corresponding screw thread provided in the aperture in the connector.

12. An assembly according to claim 1 wherein the or each bayonet connector formation is engaged with a corresponding engagement formation provided in the wall of the tubular surrounding the side bore so that translational movement of the drill pipe connector body relative to the tubular is restricted or prevented.

13. An assembly according to claim 12 wherein the or each engagement formation comprises a lip formation which extends radially inwardly from the wall enclosing the side bore into the side bore, around only part of the circumference of the wall enclosing the side bore, and along only part of the depth of the wall enclosing the side bore, the depth being the distance between the exterior of the tubular and the main bore.

14. An assembly according to claim 12 wherein there are the same number of engagement formations as there are bayonet connector formations provided on the drill pipe connector body of the connector.

15. An assembly according to claim 12 wherein the height of the bayonet connector formations is such that the maximum diameter of the second end of the connector is less than the maximum internal diameter of the side bore.

16. An assembly according to claim 15 wherein the height of the lip formations is such that the maximum diameter of the second end of the connector is greater than the minimum internal diameter of the side bore.

17. An assembly according to claim 12 wherein, where one engagement formation is provided, the gap between end portions of the engagement formation is large enough for the bayonet connector formation or formations to pass through the gap between the ends of the engagement formation.

18. An assembly according to claim 12 wherein, where more than one engagement formation is provided, the separation of end portions of adjacent engagement formations is large enough one or more bayonet connector formation or formations to pass through the gap between the ends of the adjacent engagement formations.

19. A method of mounting a connector between a hose and a tubular, the tubular having a wall enclosing a main bore, and the side-bore extending through the wall from the main bore to the exterior of the tubular, the connector comprising a hose connector body which forms a first end of the connector which is adapted to be connected to the hose, and a drill pipe connector body which forms a second end of the connector which is connected to the tubular, the connector having an exterior surface and an interior surface which encloses a bore extending from the first end of the connector to a second end of the connector, the drill pipe connector body being provided with at least one bayonet connector formation which extends from the exterior surface of the connector generally radially outwardly relative to the bore, the bayonet connector formation extending over less than half of the circumference of the exterior surface of the drill pipe connector body, wherein the drill pipe connector body is also provided with means for ensuring a substantially fluid tight seal between the connector and the surface of the tubular enclosing the side-bore, the method including the steps of:
   securing the hose connector body on the hose so that flow of fluid from the hose into the bore of the connector is permitted,
   either before or after which, securing the drill pipe connector body to the hose connector body,
   then, rotating the drill pipe connector body relative to the hose connector body and the tubular so as to bring the drill pipe connector body into a first angular orientation with respect to the tubular;
   then inserting the second end of the connector into the side bore and rotating the drill pipe connector body relative to the hose connector body and the tubular to bring drill pipe connector body into a second angular orientation with respect to the tubular in which at least one bayonet connector formation engages with corresponding bayonet engagement formation provided around the side-bore of the tubular, the engagement of the bayonet connector formation with the bayonet engagement formation preventing removal of the drill pipe connector body from the side bore.

20. A method according to claim 19 wherein the step of securing the drill pipe connector body to the hose connector body comprises engaging the drill pipe connector body with the hose connector body, mounting a locking ring around the exterior of the connector and securing a first part of the locking ring to one of the hose connector body or the drill pipe connector body such that a second part engages with a locking formation provided on the other of the hose connector body or the drill pipe connector body to restrict or prevent translational movement of the hose connector body relative to the drill pipe connector body.

21. A method according to claim 19 wherein the method further includes the step of, after rotation of the drill pipe connector body to the second orientation, operating a locking means so that the locking means comes into engagement with the tubular to substantially prevent further rotation of the drill pipe connector body with respect to the tubular.

22. A method according to claim 19 wherein the method further includes the step of, after rotation of the drill pipe connector body to the second orientation, operating a valve actuating member to move a valve member provided in the side bore of the tubular from a closed position to an open position.

23. A connector for connecting a hose to a side-bore of a tubular, the tubular having a wall enclosing a main bore, and the side-bore extending through the wall from the main bore to the exterior of the tubular, the connector comprising a hose connector body which forms a first end of the connector which is adapted to be connected to the hose, and a drill pipe connector body which forms a second end of the connector which is adapted to be connected to the tubular with a bayonet connector formed on the drill pipe connector body, the connector having an exterior surface and an interior surface which encloses a bore extending from the first end of the connector to a second end of the connector, wherein the connector is provided with a valve actuating member which extends into the drill pipe connector body and which may be operated when the connector is connected between a hose and a tubular to move between a first position and a second position, wherein the valve actuating member comprises a rod which extends from the bore of the connector to the exterior of the connector via an aperture in the connector.

24. A connector according to claim 23 wherein the movement of the valve actuating member from the first position to the second position comprises translational movement towards the second end of the connector.

25. A connector according to claim 23 wherein the rod is provided with a screw thread which engages with a corresponding screw thread provided in the aperture in the connector.

* * * * *